United States Patent
Hong (10) Patent No.: US 11,153,805 B2
(45) Date of Patent: Oct. 19, 2021

(54) ACCESS CONTROL EXECUTION METHOD, DEVICE, AND SYSTEM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/629,743

(22) PCT Filed: Aug. 29, 2017

(86) PCT No.: PCT/CN2017/099447
§ 371 (c)(1),
(2) Date: Jan. 9, 2020

(87) PCT Pub. No.: WO2019/041125
PCT Pub. Date: Mar. 7, 2019

(65) Prior Publication Data
US 2020/0236609 A1 Jul. 23, 2020

(51) Int. Cl.
| | | |
|---|---|---|
| *H04W 48/02* | (2009.01) |
| *H04B 7/185* | (2006.01) |
| *H04W 48/10* | (2009.01) |
| *H04W 74/08* | (2009.01) |

(52) U.S. Cl.
CPC ........ *H04W 48/02* (2013.01); *H04B 7/18506* (2013.01); *H04W 48/10* (2013.01); *H04W 74/0833* (2013.01)

(58) Field of Classification Search
CPC . H04W 48/02; H04W 48/10; H04W 74/0833; H04B 7/18506
USPC .......... 455/434, 431, 421, 435.1, 418, 422.1
See application file for complete search history.

(56) References Cited

U.S. PATENT DOCUMENTS

| | | |
|---|---|---|
| 9,125,218 B2 * | 9/2015 | Chang ................... H04W 74/08 |
| 2011/0134779 A1 | 6/2011 | Kim et al. |
| 2015/0181544 A1 | 6/2015 | Liu et al. |
| 2018/0242140 A1 * | 8/2018 | Meredith ................ H04W 8/24 |
| 2018/0288713 A1 * | 10/2018 | Kosseifi ............ H04W 52/0212 |

FOREIGN PATENT DOCUMENTS

| | | |
|---|---|---|
| CN | 101400145 A | 4/2009 |
| CN | 101483923 A | 7/2009 |
| CN | 106537984 A | 3/2017 |

* cited by examiner

*Primary Examiner* — Nghi H Ly
(74) *Attorney, Agent, or Firm* — Finnegan, Henderson, Farabow, Garrett & Dunner, L.L.P.

(57) ABSTRACT

The present disclosure relates to an access control execution method, a device, and a system, belonging to the field of wireless communication. The method includes: upon detection of a random access trigger event, acquiring an access reference value received from a base station; generating a random numerical value within a preset numerical value range, comparing the random numerical value with the access reference value; if the comparison result between the random numerical value and the access reference value satisfies a preset access control condition, executing random access process. The present disclosure can be used for improving the quality of data transmissions in a cellular network.

10 Claims, 5 Drawing Sheets

ACCESS CONTROL EXECUTION METHOD, DEVICE, AND SYSTEM

CROSS REFERENCE TO RELATED APPLICATIONS

This application is a national phase application based on PCT/CN2017/099447, filed Aug. 29, 2017, the content of which is incorporated herein by reference.

TECHNICAL FIELD

The present disclosure relates to the field of wireless communication, and more particularly to a method, a device, and a system for performing access control.

BACKGROUND

With the development of unmanned aerial vehicle (UAV) technology, the application field of UAVs has become more and more extensive.

In order to further expand the application range of the UAVs, data of a UAV can be transmitted based on a cellular network, and the data may be control instructions or image data. For example, when a UAV is performing aerial photographing operation, control instructions for the UAV from a remote controller and image data captured by the UAV can be transmitted over the cellular network. When the UAV is transmitting data, there is a high timeliness requirement on data transmission and thus a high transmission power is employed for transmitting data of the UAV.

SUMMARY

According to a first aspect of embodiments of the present disclosure, a method for performing access control is provided. The method includes:

acquiring an access reference value received from a base station upon detection of a random access trigger event;

generating a random numerical value within a preset numerical value range, and comparing the random numerical value with the access reference value; and performing a random access process if a comparison result between the random numerical value and the access reference value satisfies a preset access control condition.

According to a second aspect of embodiments of the present disclosure, a method for performing access control is provided. The method includes:

broadcasting a preset access reference value;

wherein the access reference value is used by an aircraft, so that the access reference value received from the base station is acquired by the aircraft upon detection of a random access trigger event, a random numerical value within a preset numerical value range is generated, the random numerical value is compared with the access reference value, and a random access process is performed if the comparison result between the random a random access process value and the access reference value satisfies a preset access control condition.

According to a third aspect of embodiments of the present disclosure, an aircraft is provided, including:

an acquiring module configured to acquire an access reference value received from a base station upon detection of a random access trigger event;

a comparing module configured to generate a random numerical value within a preset numerical value range, and compare the random numerical value with the access reference value; and a performing module configured to perform a random access process if a comparison result between the random numerical value and the access reference value satisfies a preset access control condition.

According to a fourth aspect of embodiments of the present disclosure, a base station is provided, including:

a broadcast module configured to broadcast a preset access reference value;

wherein the access reference value is used by an aircraft, so that the access reference value received from the base station is acquired by the aircraft upon detection of a random access trigger event, a random numerical value within a preset numerical value range is generated, the random numerical value is compared with the access reference value, and a random access process is performed if a comparison result between the random numerical value and the access reference value satisfies a preset access control condition.

According to a fifth aspect of embodiments of the present disclosure, a system for performing access control is provided, including an aircraft and a base station, wherein:

the aircraft is the aircraft according to the third aspect; and the base station is the base station according to the fourth aspect.

According to a sixth aspect of embodiments of the present disclosure, an aircraft is provided, including a processor and a memory, the memory storing at least one piece of instruction which is loaded and executed by the processor to perform the method for performing access control according to the first aspect.

According to a seventh aspect of embodiments of the present disclosure, a computer readable storage medium is provided, wherein the storage medium stores at least one piece of instruction which is loaded and executed by a processor to perform the method for performing access control according to the first aspect.

According to an eighth aspect of embodiments of the present disclosure, a base station is provided, including: a processor and a memory, wherein the memory stores at least one piece of instruction which is loaded and executed by the processor to perform the method for performing access control according to the second aspect.

According to a ninth aspect of embodiments of the present disclosure, a computer readable storage medium is provided, wherein the storage medium stores at least one piece of instruction which is loaded and executed by a processor to perform the method for performing access control according to the second aspect.

The technical solutions provided by the embodiments of the present disclosure can include the following beneficial effects.

In the embodiments of the present disclosure, upon detection of a random access trigger event, the aircraft acquires an access reference value received from the base station, generates a random numerical value within a preset numerical value range, and compares the random numerical value with the access reference value. If the comparison result between the random numerical value and the access reference value satisfies a preset access control condition, the aircraft performs the random access process. In this way, by introducing the base station access reference value, there is a certain probability for the aircraft to initiate the random access process, and thus the number of aircrafts accessing the base station can be controlled, which reduces interference on neighboring cells, thereby improving data transmission quality in the cellular network.

It should be understood that both the foregoing general description and the following detailed description are exemplary and explanatory only and are not restrictive of the disclosure.

BRIEF DESCRIPTION OF THE DRAWINGS

In order to more clearly illustrate the technical solutions in the embodiments of the present disclosure, the drawings used in the description of the embodiments will be briefly described below. Apparently, the drawings in the following description are only some embodiments of the present disclosure. Other drawings may also be obtained from theses drawings by those of ordinary skill in the art without paying creative labor.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Exemplary embodiments of the present disclosure provide a method for performing access control, which can be implemented by an aircraft together with a base station.

The aircraft can include a processor, a memory, a transceiver, a flight component, and the like. The processor can be a CPU (Central Processing Unit) or the like, and can be used to generate random numerical values, perform random access, and the like. The memory can be a RAM (Random Access Memory), a Flash, and the like, and can be configured to store received data, data required for processing, data generated during processing, and the like, such as random numerical values, access reference values, and the like. The transceiver can be used for performing data transmission with the base station, for example, receiving a preset access reference value broadcast by the base station. The transceiver can include an antenna, a matching circuit, a modem, and the like. The flight components can include an electric motor, a propeller, and the like. The electric motor is configured to provide power to the aircraft flight, and the propeller is configured to propel the air flow to implement flight.

The base station can include components such as a processor, a memory, a transceiver, and the like. The processor can be a CPU or the like. The memory, which can be a RAM, a Flash, and the like, can be used to store received data, data required for processing, data generated during processing, and the like, such as access reference values. The transceiver can be used for performing data transmission with a UAV, for example, broadcasting a preset access reference value, and the like. The transceiver can include an antenna, a matching circuit, a modem, and the like.

Figure 1:
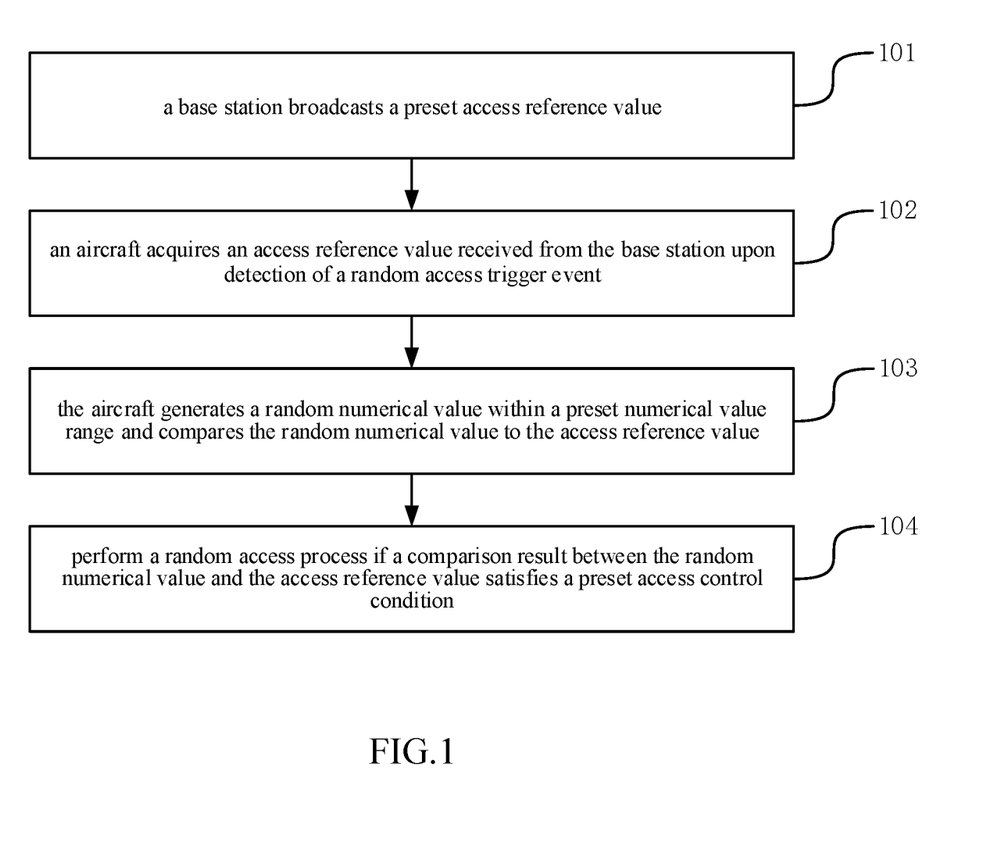
FIG. 1 is a flowchart of a method for performing access control according to an exemplary embodiment.

As shown in FIG. 1, the process of the method can include the following steps.

In step 101, the base station broadcasts a preset access reference value.

The access reference value can be a numerical value between 0 and 1, which is used for controlling a probability for an aircraft to initiate a random access process. The access reference value can be an access reference value for aircrafts, that is, other types of terminals (for example, a smartphone) can receive the access reference value but cannot use the access reference value.

Figure 2:
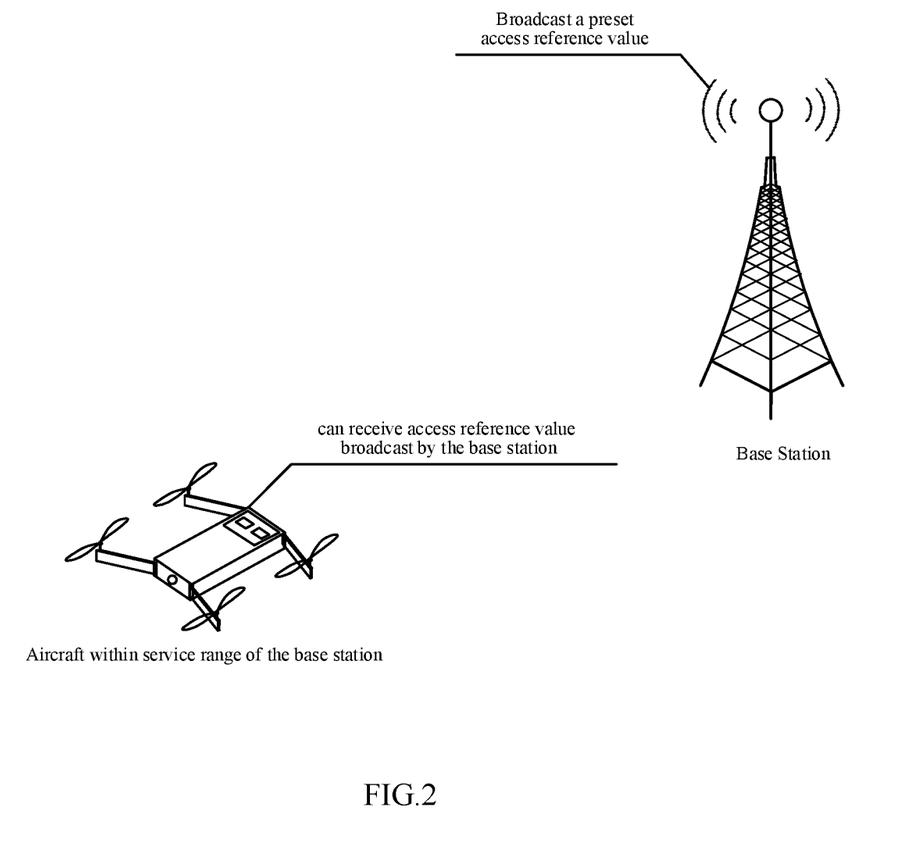
FIG. 2 is a schematic diagram of a scenario in which a base station broadcasts a preset access reference value according to an exemplary embodiment.

In an implementation, the access reference value can be preset for a base station by a technician as needed, and different access reference values or the same reference value can be set for different base stations. In turn, the base station can periodically broadcast the preset access reference value to terminals within the service area. For example, the base station can add the preset access reference value to a SIB2 (System Information Blocks 2) message, and broadcast the SIB2 message carrying the preset access reference value. A schematic diagram of a base station broadcasting a preset access reference value is as shown in FIG. 2.

Optionally, the base station can broadcast preset access reference values corresponding to different transaction types.

The transaction type can include a control transaction, a data transaction, and the like. The control transaction can be a transaction in which a remote controller transmits control instructions to an aircraft through a cellular network, and the data transaction can be a transaction in which an aircraft transmits image data, video data, and the like based on a cellular network.

Figure 3:
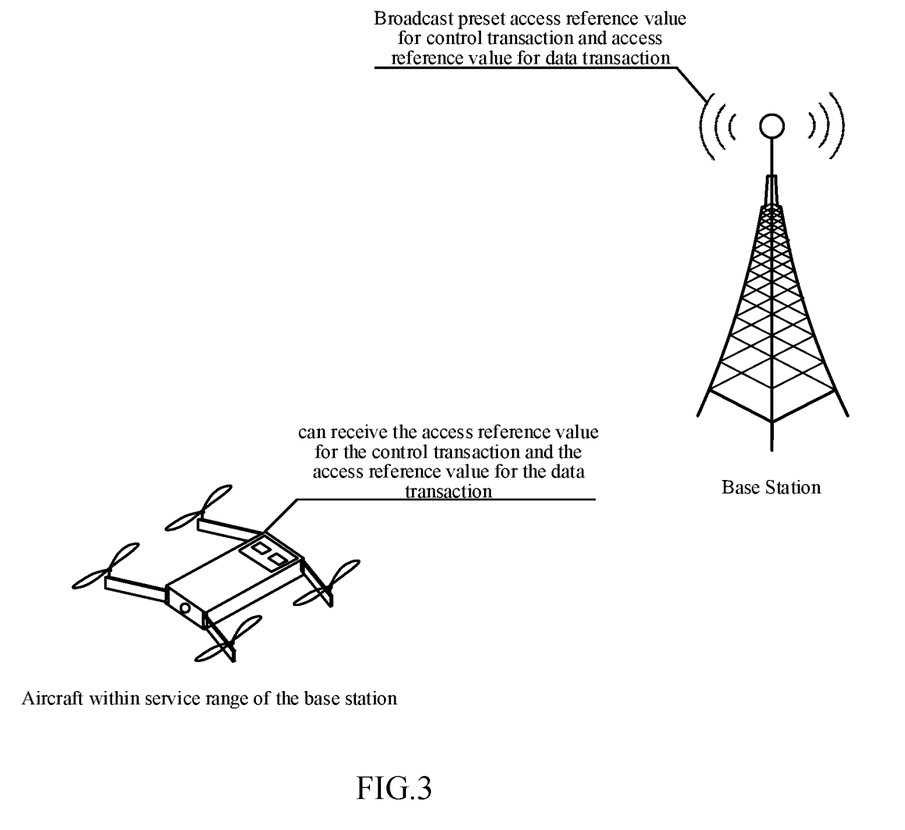
FIG. 3 is a schematic diagram of a scenario in which a base station broadcasts preset access reference values corresponding to different transaction types according to an exemplary embodiment.

In an implementation, for different transaction types, transaction volumes are different and sizes of base station resources required for transmitting data based on the cellular network are also different. Therefore, the technician can set corresponding access reference values for different transaction types. A schematic diagram of a base station broadcasting preset access reference values corresponding to different transaction types is as shown in FIG. 3. For example, the transaction volume for the control transaction is small, the size of the base station resources required for transmitting the control instructions based on the cellular network is small, and the base station can serve more aircrafts that request the control transaction. Therefore, the probability that the aircraft requesting the control transaction initiates a random access process can be made higher by setting the corresponding access reference value. Correspondingly, the transaction volume for the data transaction is large, the size of the base station resources required for transmitting data based on the cellular network is large, and the base station can serve fewer aircrafts that request the data transaction. Therefore, the probability that the aircraft requesting the data transaction initiates a random access process can be made lower by setting the corresponding access reference value. The correspondence between the transaction type and its corresponding access reference value can be stored in a form of a correspondence table, as shown in Table 1 below.

TABLE 1

| Transaction Type | Access Reference Value |
|---|---|
| Control Transaction | 0.6 |
| Data Transaction | 0.4 |

In step 102, the aircraft acquires the access reference value received from the base station upon detecting a random access trigger event.

In an implementation, the aircraft can receive the access reference value broadcasted by the base station in the cell in which the aircraft resides, further store the received access reference value, and subsequently replace the locally stored access reference value with the received latest access reference value. There may be various situations for the random access trigger event of the aircraft, such as the aircraft initially accessing the base station, re-establishing the connection with the base station when the idle state is released, and the like. When the aircraft detects the random access trigger event, the aircraft can read the locally stored access reference value for use in subsequent processing.

Optionally, in the case where the base station broadcasts the access reference value corresponding to each of the different transaction types as described above, the processing by the aircraft can be as follows: acquiring the access reference values corresponding to the different transaction types received from the base station, and determining an access reference value corresponding to a target transaction type to which a transaction to be performed belongs according to the access reference values corresponding to different transaction types.

In an implementation, after the user selects a flight mode for the aircraft, the aircraft can read the corresponding access reference value based on the transaction type corresponding to the selected flight mode. For example, the flight mode of the aircraft can include a control mode, an aerial photographing mode, and the like. The transaction type corresponding to the control mode is a control transaction, and the transaction type corresponding to the aerial photographing mode is a data transaction. When the flight mode selected by the user is the control mode, the aircraft can read the access reference value corresponding to the control transaction as the probability of the aircraft initiating the random access process. When the flight mode selected by the user is the aerial photographing mode, the aircraft can read the access reference value corresponding to the data service as the probability of the aircraft initiating the random access process.

In step 103, the aircraft generates a random numerical value within a preset numerical value range and compares the random numerical value to the access reference value.

Corresponding to the access reference value, the random numerical value can be a numerical value between 0-1, that is, the preset numerical value range can be a range of 0-1.

Optionally, in the case where there are different access reference values corresponding to different transaction types, the aircraft can compare the generated random numerical value with the access reference value corresponding to the target transaction type.

In an implementation, after the aircraft reads the access reference value corresponding to the target transaction type in the correspondence table, the generated random numerical value can be compared with the access reference value.

For example, if the aircraft reads the access reference value corresponding to the control transaction, the random numerical value is compared with the access reference value corresponding to the control transaction; if the aircraft reads the access reference value corresponding to the data transaction, the random numerical value is compared with the access reference value corresponding to the data transaction.

In step 104, if a comparison result between the random numerical value and the access reference value satisfies a preset access control condition, the random access process is performed.

In an implementation, if the comparison result between the random numerical value generated by the aircraft and the access reference value satisfies the preset access control condition, the aircraft can initiate the random access process. On the other hand, if the comparison result between the random numerical value generated by the aircraft and the access reference value does not satisfy the preset access control condition, the aircraft will not initiate the random access process at this time.

Optionally, the preset access control condition can be that the generated random numerical value is smaller than or larger than the access reference value, and the corresponding process can be as follows: if the random numerical value is smaller than the access reference value, performing the random access process; or, if the random numerical value is larger than the access reference value, performing the random access process.

In an implementation, if the preset random condition is that the generated random numerical value is smaller than the access reference value, that is, the access reference value is the probability that the aircraft can initiate the random access process, when the random numerical value is smaller than the access reference value, the aircraft can initiate the random access process. For example, the access reference value can be 0.6, i.e., there is a probability of 0.6 for an aircraft within a service area of the base station to initiate the random access process. If the random numerical value generated by the aircraft is 0.3, that is, the random numerical value is smaller than the access reference value and the preset random condition is satisfied, the random access process can be initiated.

Similar to the above, when the random numerical value is smaller than the access reference value corresponding to the target transaction type, the aircraft can initiate the random access process. For example, if the preset random condition is that the generated random numerical value is smaller than the access reference value, the access reference value corresponding to the control transaction can be 0.6, and the access reference value corresponding to the data transaction can be 0.4. That is, when the flight mode of the aircraft within the service area of the base station is the control mode, there can be a probability of 0.6 that the random access process can be initiated. If the random numerical value generated by the aircraft in the control mode is 0.5, that is, the random numerical value is smaller than the access reference value and the preset random condition is satisfied, the random access process can be initiated. When the flight mode of the aircraft within the service area of the base station is the data mode, there can be a probability of 0.4 that the random access process can be initiated. If the random numerical value generated by the aircraft in the aerial photographing mode is 0.3, that is, the random numerical value is smaller than the access reference value and the preset random condition is satisfied, the random access process can be initiated.

On the other hand, if the preset random condition is that the generated random numerical value is larger than the access reference value, that is, the access reference value is the probability that the aircraft is prohibited from initiating the random access process, when the random numerical value is larger than the access reference value, the aircraft can initiate the random access process. For example, the access reference value can be 0.6, that is, there can be a probability of 0.6 for the aircraft within the service area of the base station to be prohibited from initiating the random access process, and a probability of 0.4 that the aircraft can initiate the random access process. If the random numerical value generated by the aircraft is 0.7, that is, the random numerical value is larger than the access reference value and the preset random condition is satisfied, the random access process can be initiated.

Similar to the above, when the random numerical value is larger than the access reference value corresponding to the target transaction type, the aircraft can initiate the random access process. For example, if the preset random condition is that the generated random numerical value is larger than the access reference value, the access reference value corresponding to the control transaction can be 0.4, and the access reference value corresponding to the data transaction can be 0.6. That is, when the flight mode of the aircraft within the service area of the base station is the control mode, there is a probability of 0.4 for the aircraft to be prohibited from initiating the random access process, and a probability of 0.6 that the aircraft can initiate the random access process. If the random numerical value generated by the aircraft in the control mode is 0.5, that is, the random numerical value is larger than the access reference value and the preset random condition is satisfied, the random access process can be initiated. When the flight mode of the aircraft within the service area of the base station is the aerial photographing mode, there is a probability of 0.6 for the aircraft to be prohibited from initiating the random access process, and a probability of 0.4 that the aircraft can initiate the random access process. If the random numerical value generated by the aircraft in the aerial photographing mode is 0.7, that is, the random numerical value is larger than the access reference value and the preset random condition is satisfied, the random access process can be initiated.

Optionally, if the comparison result does not satisfy the access control condition, and the aircraft cannot perform the random access process, a random numerical value is generated again every preset time period, and it is determined again whether the access can be performed. The corresponding process can be as follows: generating a random numerical value in a preset numerical value range every preset time period, comparing the random numerical value with the access reference value, and correspondingly, terminating the process of generating the random numerical value in the preset numerical value range every preset time period after the random access process is performed.

In an implementation, if the comparison result between the random numerical value generated by the aircraft and the access reference value does not satisfy the preset access control condition, a random numerical value between 0-1 can be generated again after the preset time period. Further, the random numerical value can be compared with the access reference value, and if the comparison result between the random numerical value and the access reference value satisfies the preset access control condition, the random access process is performed. The specific processing after generating the random numerical value has been introduced in the previous description of the embodiment, and details are not repeated herein.

If the comparison result between the random numerical value generated by the aircraft and the access reference value still does not satisfy the preset access control condition, a random numerical value between 0-1 is generated again after the preset time period, and subsequent processing is performed, which will not be repeated herein. The aircraft does not perform the random access process until the comparison result satisfies the access control condition, or the aircraft changes to an off state, and the process of generating the random numerical value within the preset numerical value range every preset time period terminates.

In the embodiments of the present disclosure, upon detection of a random access trigger event, the aircraft acquires an access reference value received from the base station, generates a random numerical value within a preset numerical value range, and compares the random numerical value with the access reference value. If the comparison result between the random numerical value and the access reference value satisfies the preset access control condition, the aircraft performs the random access process. In this way, by introducing the base station access reference value, there is a certain probability for the aircraft to initiate the random access process, and thus the number of the aircrafts accessing the base station can be controlled, which reduces the interference on neighboring cells, thereby improving data transmission quality in the cellular network.

Figure 4:
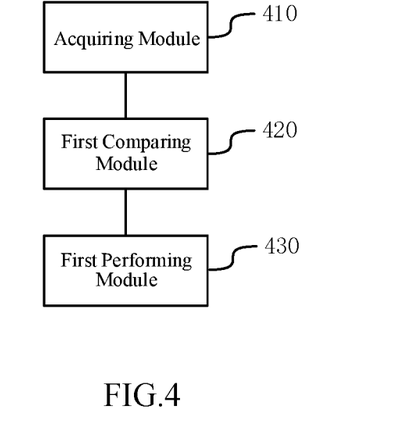
FIG. 4 is a block diagram of an aircraft according to an exemplary embodiment.

Yet another exemplary embodiment of the present disclosure provides an aircraft. As shown in FIG. 4, the aircraft includes:

an acquiring module 410 configured to acquire an access reference value received from the base station upon detection of a random access trigger event;

a comparing module 420 configured to generate a random numerical value within a preset numerical value range, and compare the random numerical value with the access reference value; and a performing module 430 configured to perform a random access process if a comparison result between the random numerical value and the access reference value satisfies a preset access control condition.

Optionally, the performing module 430 is configured to: perform the random access process if the random numerical value is less than the access reference value.

Optionally, the acquiring module 410 is configured to acquire access reference values corresponding to different transaction types which are received from the base station; and determine an access reference value of a target transaction type to which a transaction to be performed belongs according to the access reference values corresponding to the different transaction types.

The comparing module 420 is configured to compare the random numerical value with the access reference value corresponding to the target transaction type.

Optionally, the comparing module 420 is configured to generate the random numerical value in the preset numerical value range every preset time period, and compare the random numerical value with the access reference value.

The comparing module 420 is further configured to terminate the process of generating the random numerical value within the preset numerical value range every preset time period after the random access process is performed.

With regard to the device in the above embodiments, the specific approach in which the respective modules perform the operations has been described in detail in the embodiments relating to the method, details of which will not be repeated herein.

In the embodiments of the present disclosure, upon detection of a random access trigger event, the aircraft acquires an access reference value received from the base station, generates a random numerical value within a preset numerical value range, and compares the random numerical value with the access reference value. If the comparison result between the random numerical value and the access reference value satisfies a preset access control condition, the aircraft performs the random access process. In this way, by introducing the base station access reference value, there is a certain probability for the aircraft to initiate the random access process and thus the number of the aircrafts accessing the base station can be controlled, which reduces the interference on neighboring cells, thereby improving data transmission quality in the cellular network.

Figure 5:
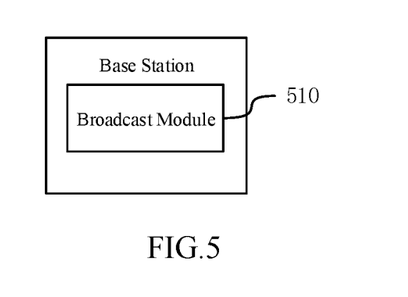
FIG. 5 is a block diagram of a base station according to an exemplary embodiment.

Yet another exemplary embodiment of the present disclosure provides a base station. As shown in FIG. 5, the base station includes:

a broadcasting module 510 configured to broadcast a preset access reference value.

The access reference value is used by the aircraft so that the access reference value received from the base station is acquired by the aircraft upon detection of a random access trigger event, a random numerical value within a preset numerical value range is generated, the random numerical value is compared with the access reference value, and a random access process is performed if the comparison result between the random numerical value and the access reference value satisfies a preset access control condition.

Optionally, the broadcast module 510 is configured to broadcast preset access reference values corresponding to different transaction types.

With regard to the device in the above embodiments, the specific approach in which the respective modules perform the operations has been described in detail in the embodiments relating to the method, details of which will not be repeated herein.

In the embodiments of the present disclosure, the base station broadcasts the preset access reference value. Upon detection of the random access trigger event, the aircraft acquires the access reference value received from the base station, generates the random numerical value within the preset numerical value range, and compares the random numerical value with the access reference value. If the comparison result between the random numerical value and the access reference value satisfies the preset access control condition, the aircraft performs the random access process. In this way, by introducing the base station access reference value, there is a certain probability for the aircraft to initiate the random access process, and thus the number of the aircrafts accessing the base station can be controlled, which reduced the interference on neighboring cells, thereby improving data transmission quality in the cellular network.

It should be noted that, when performing the access control, the device for performing the access control provided in the foregoing embodiments is only illustrated by way of the divided functional modules aforementioned. In actual applications, the foregoing functions may be allocated to be implemented by different functional modules as needed. That is, the internal structure of the device is divided into different functional modules to implement all or part of the functions described above. In addition, the device for performing the access control and the method for performing the access control provided in the foregoing embodiments come from the same concept, and the specific implementation process has been described in detail in the method embodiments, details of which will not be repeated herein.

Yet another exemplary embodiment of the present disclosure provides a system for performing access control, and the system includes an aircraft and a base station.

The aircraft is configured to acquire an access reference value received from the base station upon detection of a random access trigger event, generate a random numerical value within a preset numerical value range, and compare the random numerical value and the access reference value, and perform a random access process if the comparison result between the random numerical value and the access reference value satisfies a preset access control condition.

The base station is configured to broadcast a preset access reference value, wherein the access reference value is used by the aircraft so that the access reference value received from the base station is acquired by the aircraft upon detection of a random access trigger event, a random numerical value within a preset numerical value range is generated, the random numerical value is compared with the access reference value, and a random access process is performed if the comparison result between the random numerical value and the access reference value satisfies a preset access control condition.

In the embodiments of the present disclosure, the base station broadcasts the preset access reference value. Upon detection of the random access trigger event, the aircraft acquires the access reference value received from the base station, generates the random numerical value within the preset numerical value range, and compares the random numerical value with the access reference value. If the comparison result between the random numerical value and the access reference value satisfies the preset access control condition, the aircraft performs the random access process. In this way, by introducing the base station access reference value, there is a certain probability for the aircraft to initiate the random access process, and thus the number of the aircrafts accessing the base station can be controlled, which reduces the interference on neighboring cells, thereby improving data transmission quality in the cellular network.

Figure 6:
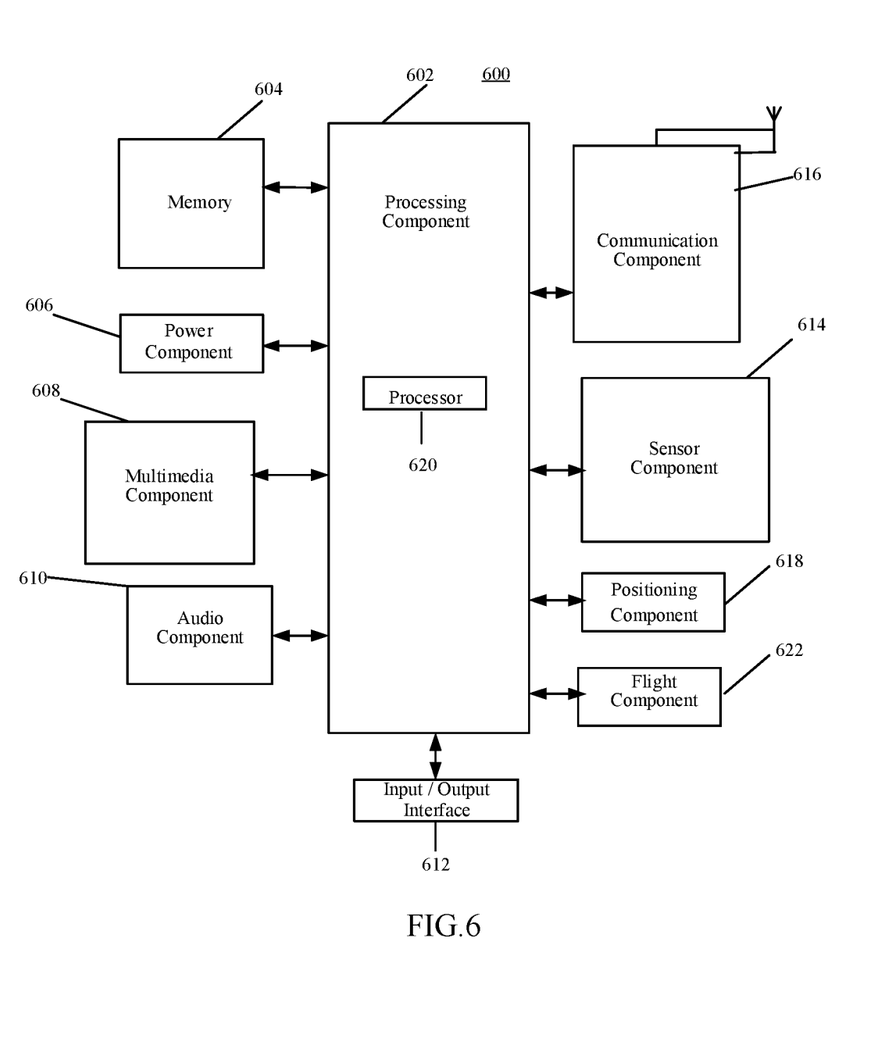
FIG. 6 is a block diagram of an aircraft according to an exemplary embodiment.

Yet another exemplary embodiment of the present disclosure shows a structural block diagram of an aircraft. The aircraft may be a cellular network UAV or the like.

Referring to FIG. 6, the aircraft 600 can include one or more of the following components: a processing component 602, a memory 604, a power component 606, a multimedia component 608, an audio component 610, an input/output (I/O) interface 612, a sensor component 614, a communication component 616, a positioning component 618 and a flight component 622.

The processing component 602 typically controls overall operations of the aircraft 600, such as the operations associated with display, phone call, data communication, camera operations, and recording operations. The processing component 602 may include one or more processors 620 to execute instructions, to perform all or part of the steps of the above method. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the aircraft 600. Examples of such data include instructions for any applications or methods operated on the aircraft 600, contact data, phone directory data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the aircraft 600. The power component 606 may include a power management system, one or more power sources, and any other components associated with the generation, management, and distribution of power in the aircraft 600.

In some embodiments, the multimedia component 608 includes a front camera and/or a rear camera. When the aircraft 600 is in an operation mode, such as a photographing mode or a video mode, the front camera and/or the rear camera can receive external multimedia data. Each of the front camera and the rear camera can be a fixed optical lens system or have focal length and optical zoom capability.

The audio component 610 is configured to output and/or input audio signals. For example, the audio component 610 includes a microphone ("MIC") configured to receive an external audio signal when the aircraft 600 is in an operation mode, such as a call mode, a recording mode, and a voice recognition mode. The received audio signal may be further stored in the memory 604 or transmitted via the communication component 616.

The I/O interface 612 provides an interface between the processing component 602 and peripheral interface modules, such as a keyboard, a click wheel, buttons, and the like. These buttons may include, but are not limited to, a home button, a volume button, a start button, and a lock button.

The sensor component 614 includes one or more sensors to provide status assessments of various aspects of the aircraft 600. For instance, the sensor component 614 may detect an open/closed status of the aircraft 600, relative positioning of components, e.g., the display and the keypad, of the aircraft 600, a change in position of the aircraft 600 or a component of the aircraft 600, a presence or absence of user contact with the aircraft 600, an orientation or an acceleration/deceleration of the aircraft 600, and a change in temperature of the aircraft 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the aircraft 600 and other devices. The aircraft 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

The positioning component 618 is configured to facilitate the aircraft 600 to determine position coordinates, which may be implemented using GPS or a Beidou satellite navigation system.

The flight component 622 may include an electric motor, a propeller, or the like for providing flight power to the aircraft 600.

In exemplary embodiments, the aircraft 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method.

In exemplary embodiments, there is also provided a non-transitory computer-readable storage medium including instructions, such as included in the memory 604, executable by the processor 620 in the aircraft 600 to perform the above method. For example, the non-transitory computer-readable storage medium may be a ROM, a RAM, a CD-ROM, a magnetic tape, a floppy disc, an optical data storage device, and the like.

Yet another embodiment of the present disclosure provides a non-transitory computer readable storage medium that, when instructions in the storage medium are executed by a processor of an aircraft, enables the aircraft to perform:

acquiring an access reference value received from the base station upon detection of a random access trigger event;

generating a random numerical value within a preset numerical value range, and comparing the random numerical value with the access reference value; and performing a random access process if a comparison result between the random numerical value and the access reference value satisfies a preset access control condition.

Optionally, the performing the random access process if the comparison result between the random numerical value and the access reference value satisfies the preset access control condition includes:

performing the random access process if the random numerical value is smaller than the access reference value.

Optionally, the acquiring the access reference value received from the base station includes: acquiring the access reference values corresponding to different transaction types received from the base station, and determining an access reference value corresponding to a target transaction type to which a transaction to be performed belongs according to the access reference values corresponding to the different transaction types.

The comparing the random numerical value with the access reference value includes: comparing the random numerical value with the access reference value corresponding to the target transaction type.

Optionally, the generating the random numerical value within the preset numerical value range, and comparing the random numerical value with the access reference value includes:

generating the random numerical value within the preset numerical value range and comparing the random numerical value with the access reference value every preset time period.

The method further includes: terminating the process of generating the random numerical value within the preset numerical value range every preset time period after the random access process is performed.

In the embodiments of the present disclosure, upon detection of the random access trigger event, the aircraft acquires the access reference value received from the base station, generates the random numerical value within the preset numerical value range, and compares the random numerical value with the access reference value. If the comparison result between the random numerical value and the access reference value satisfies the preset access control condition, the aircraft performs the random access process. In this way, by introducing the base station access reference value, there is a certain probability for the aircraft to initiate the random access process, and thus the number of the aircrafts accessing the base station can be controlled, which reduces the interference on neighboring cells, thereby improving data transmission quality in the cellular network.

Figure 7:
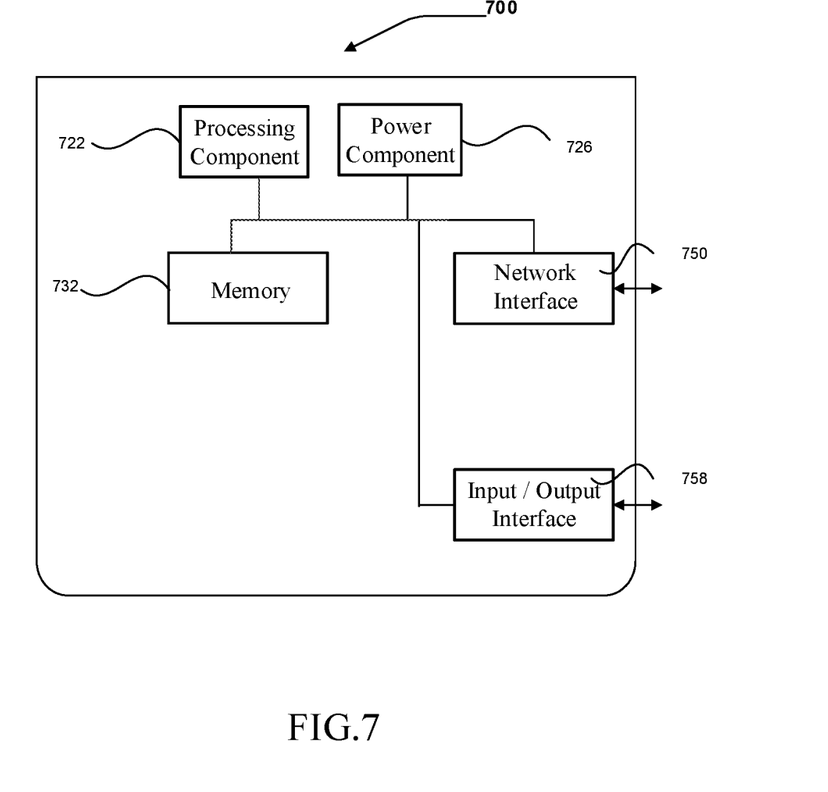
FIG. 7 is a block diagram of a base station according to an exemplary embodiment.

Yet another exemplary embodiment of the present disclosure shows a structural block diagram of a base station.

Referring to FIG. 7, the base station 700 includes a processing component 722 that further includes one or more processors, and memory resources represented by a memory 732 for storing instructions executable by the processing component 722, such as an application. The application stored in the memory 732 can include one or more modules each corresponding to a set of instructions. In addition, the processing component 722 is configured to execute instructions to perform the above-described method for controlling flight.

The base station 700 can also include a power component 726 configured to perform power management of the base station 700, a wired or wireless network interface 750 configured to connect the base station 700 to the network, and an input/output (I/O) interface 758.

The base station 700 can include a memory, and one or more programs, wherein the one or more programs are stored in the memory and configured to be executed by one or more processors so as to execute instructions contained in the one or more programs which are used for performing the access control method.

Yet another embodiment of the present disclosure provides a non-transitory computer readable storage medium that, when instructions in the storage medium are executed by a processor of a base station, enables the base station to perform:

broadcasting a preset access reference value;

wherein the access reference value is used by the aircraft so that the access reference value received from the base station is acquired by the aircraft upon detection of a random access trigger event, a random numerical value within a preset numerical value range is generated, the random numerical value is compared with the access reference value, and the random access process is performed if the comparison result between the random numerical value and the access reference value satisfies a preset access control condition.

Optionally, broadcasting a preset access reference value includes:

broadcasting the preset access reference values corresponding to different transaction types.

In the embodiments of the present disclosure, the base station broadcasts the preset access reference value. Upon detection of the random access trigger event, the aircraft acquires the access reference value received from the base station, generates the random numerical value within the preset numerical value range, and compares the random numerical value with the access reference value. If the comparison result between the random numerical value and the access reference value satisfies the preset access control condition, the aircraft performs the random access process. In this way, by introducing the base station access reference value, there is a certain probability for the aircraft to initiate the random access process, and thus the number of the aircrafts accessing the base station can be controlled, which reduces the interference on neighboring cells, thereby improving data transmission quality in the cellular network.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for performing access control, applied to an aircraft, the method comprising:
   acquiring an access reference value, corresponding to a transaction type of the aircraft, received from a base station upon detection of a random access trigger event for triggering a random access process of the aircraft;
   generating a random numerical value within a preset numerical value range, and comparing the random numerical value with the access reference value; and
   performing the random access process of the aircraft if a comparison result between the random numerical value and the access reference value satisfies a preset access control condition.

2. The method according to claim 1, wherein the performing the random access process of the aircraft if the comparison result between the random numerical value and the access reference value satisfies the preset access control condition comprises:
   performing the random access process of the aircraft if the random numerical value is smaller than the access reference value.

3. The method according to claim 1, wherein the acquiring the access reference value received from the base station comprises:
   acquiring access reference values corresponding to different transaction types received from the base station, and determining an access reference value corresponding to a target transaction type to which a transaction to be performed belongs according to the access reference values corresponding to different transaction types; and
   the comparing the random numerical value with the access reference value comprises: comparing the random numerical value with the access reference value corresponding to the target transaction type.

4. The method according to claim 3, wherein the generating the random numerical value within the preset numerical value range and comparing the random numerical value with the access reference value comprises:
   generating the random numerical value within the preset numerical value range and comparing the random numerical value with the access reference value in every preset time period; and the method further comprises: terminating the generating the random numerical value within the preset numerical value range in every preset time period, after the random access process of the aircraft is performed.

5. A method for performing access control, applied to a base station, the method comprising:
broadcasting a preset access reference value corresponding to a transaction type of an aircraft;
wherein the broadcasted access reference value is acquired by the aircraft upon detection of a random access trigger event for triggering a random access process of the aircraft, and wherein a random numerical value within a preset numerical value range is generated and compared with the access reference value, and the random access process of the aircraft is performed if a comparison result between the random numerical value and the access reference value satisfies a preset access control condition.

6. The method according to claim 5, wherein the broadcasting the preset access reference value comprises:
broadcasting preset access reference values corresponding to different transaction types.

7. An aircraft comprising:
a processor; and
a memory for storing instructions executable by the processor,
wherein the processor is configured to:
acquire an access reference value, corresponding to a transaction type of the aircraft, received from a base station upon detection of a random access trigger event for triggering a random access process of the aircraft;
generate a random numerical value within a preset numerical value range, and compare the random numerical value with the access reference value; and
perform the random access process of the aircraft if a comparison result between the random numerical value and the access reference value satisfies a preset access control condition.

8. The aircraft according to claim 7, wherein the processor is further configured to:
perform the random access process of the aircraft if the random numerical value is smaller than the access reference value.

9. The aircraft according to claim 7, wherein the processor is further configured to:
acquire access reference values corresponding to different transaction types received from the base station, and determine an access reference value corresponding to a target transaction type to which a transaction to be performed belongs according to the access reference values corresponding to different transaction types; and
compare the random numerical value with the access reference value corresponding to the target transaction type.

10. The aircraft according to claim 9, wherein the processor is further configured to:
generate the random numerical value within the preset numerical value range and compare the random numerical value with the access reference value in every preset time period; and
terminate generating the random numerical value within the preset numerical value range in every preset time period, after the random access process of the aircraft is performed.

* * * * *